United States Patent
Beil et al.

(10) Patent No.: US 11,273,872 B2
(45) Date of Patent: Mar. 15, 2022

(54) VEHICLE STRUCTURAL COMPONENT AND METHOD FOR PRODUCING A VEHICLE STRUCTURAL COMPONENT

(71) Applicant: Bayerische Motoren Werke Aktiengesellschaft, Munich (DE)

(72) Inventors: Andreas Beil, Munich (DE); Michael Brauch, Baldham (DE); Thomas Hogger, Otterfing (DE); Octavian Knoll, Munich (DE); Oleg Konrad, Ergolding (DE); Sebastian Krull, Weihmichl (DE); Tobias Preuss, Munich (DE); Simon Spitzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/899,937

(22) Filed: Jun. 12, 2020

(65) Prior Publication Data

US 2020/0307708 A1 Oct. 1, 2020

Related U.S. Application Data

(63) Continuation of application No. PCT/EP2018/081044, filed on Nov. 13, 2018.

(30) Foreign Application Priority Data

Dec. 15, 2017 (DE) ..................... 10 2017 222 877.6

(51) Int. Cl.
*B62D 25/06* (2006.01)
*B62D 29/00* (2006.01)

(52) U.S. Cl.
CPC ........... *B62D 25/06* (2013.01); *B62D 29/005* (2013.01)

(58) Field of Classification Search
CPC ........ B62D 25/06; B62D 25/04; B62D 25/02; B62D 29/004; B62D 29/005; B62D 29/043
USPC ......... 296/187.01, 203.01, 2, 4, 193.06, 210
See application file for complete search history.

(56) References Cited

FOREIGN PATENT DOCUMENTS

| CN | 101749496 A | 6/2010 |
|----|----|----|
| CN | 105430970 A | 3/2016 |
| DE | 10 2010 014 503 A1 | 10/2011 |
| DE | 10 2010 053 960 A1 | 6/2012 |
| DE | 10 2011 100 050 A1 | 10/2012 |
| DE | 10 2012 207 901 A1 | 11/2013 |
| DE | 10 2013 200 677 A1 | 7/2014 |
| WO | WO 2013/182524 A1 | 12/2013 |

OTHER PUBLICATIONS

PCT/EP2018/081044, International Search Report dated Feb. 27, 2019 (Two (2) pages).
German Search Report issued in German application No. 10 2017 222 877.6 dated Jul. 31, 2018, with Statement of Relevancy (Seven (7) pages).

(Continued)

*Primary Examiner* — Dennis H Pedder
(74) *Attorney, Agent, or Firm* — Crowell & Moring LLP

(57) ABSTRACT

A vehicle structural component includes at least one first and at least one second fiber-reinforced plastics insert, an injection-molded rib structure, where the injection-molded rib structure connects the plastic inserts and is injection-molded onto the plastic inserts, and at least one metal element which forms an attachment region of the vehicle structural component.

7 Claims, 5 Drawing Sheets

(56) References Cited

OTHER PUBLICATIONS

English machine translation of DE 10 2011 100 050 A1, (Ten (10) pages).
English-language Chinese Office Action issued in Chinese application No. 201880063875.2 dated Sep. 29, 2021 (Nine (9) pages).

VEHICLE STRUCTURAL COMPONENT AND METHOD FOR PRODUCING A VEHICLE STRUCTURAL COMPONENT

CROSS REFERENCE TO RELATED APPLICATIONS

This application is a continuation of PCT International Application No. PCT/EP2018/081044, filed Nov. 13, 2018, which claims priority under 35 U.S.C. § 119 from German Patent Application No. 10 2017 222 877.6, filed Dec. 15, 2017, the entire disclosures of which are herein expressly incorporated by reference.

BACKGROUND AND SUMMARY OF THE INVENTION

The present invention relates to a vehicle structural component and to a method for producing a vehicle structural component.

Vehicle structural components serve for reinforcing the vehicle structure, for example by vertical pillars or the vehicle roof structure. Furthermore, they can serve for attaching flaps and the functional elements thereof, such as spring-damper elements.

Such vehicle structural components are frequently manufactured from fiber-reinforced plastic in order to obtain a lightweight construction since these parts are not as heavy as structural components made of steel. A disadvantage in this connection is, however, that structural components made from plastic cannot be connected to the vehicle structure by conventional methods, for example by welding.

It is therefore an object of the present invention to provide a vehicle structural component for a motor vehicle, which has a low weight with simultaneously high rigidity and strength and can be connected to a body structure by hot connecting techniques. Furthermore, the intention is for the vehicle structural component to be able to be produced in large series.

This object is achieved according to the invention by a vehicle structural component, comprising at least one first and at least one second fiber-reinforced plastics insert and an injection-molded rib structure which connects the plastics inserts and is injection molded onto the plastics inserts, and at least one metallic element by means of which an attachment region of the vehicle structural component is formed.

A vehicle structural component of this type has a series of advantages: by means of the integrated metallic elements, high local ductility for absorbing energy in the event of high structural loading is achieved. Furthermore, a punctiform introduction of force is made possible. In addition, the vehicle structural component can be connected to an adjacent vehicle structure by hot connecting techniques for metallic materials, for example by welding. Furthermore, the same or additional metallic elements can be used in order to attach movable elements, for example a hinge for attaching a tailgate. The fiber-reinforced plastics inserts ensure the necessary rigidity of the vehicle structural component. By means of the injection-molded rib structure which in terms of volume makes up the main portion of the vehicle structural component, the vehicle structural component meets the requirements in respect of lightweight design.

At least one of the fiber-reinforced plastics inserts preferably protrudes through a recess in the metallic element. A good transmission of force from the vehicle structural component to the remaining vehicle structure, for example to a side frame, is thereby possible.

According to one embodiment, the at least one metallic element is designed as an insert part which has a plurality of recesses which are filled with plastic. In particular, the metallic element is surrounded, preferably insert molded, by the injection-molded rib structure in a region in which the recesses are arranged. The metallic element is thereby reliably connected to the injection-molded rib structure without additional fastening elements being required.

According to an alternative embodiment, the at least one metallic element can be connected to the injection-molded rib structure by an integrally bonded connection, frictional connection and/or form-fitting connection, in particular by adhesive bonding, riveting and/or screwing. A reliable connection between the metallic element and the injection-molded rib structure can thereby likewise be achieved.

The injection-molded rib structure can have reinforcing webs which run at an angle in relation to the plastics inserts and with respect to one another, as seen in a cross section. This results in the formation of a lattice-like structure which is particularly stable.

As seen in cross section, preferably in each case at least two adjacent reinforcing webs form a local reinforcing unit with one of the plastics inserts. For example, a plurality of reinforcing webs, in particular two adjacent reinforcing webs, run at an angle with respect to one another and are connected at the at least one first and/or at the at least one second fiber-reinforced plastics insert at a connecting point. The reinforcing webs are injection molded here on fiber-reinforced plastics inserts. Furthermore, the reinforcing webs are connected to one another via the connecting point and permit a lattice-like distribution of force, wherein the connecting points act as junction points.

In the longitudinal direction of the vehicle structural component, a multiplicity of reinforcing webs preferably run consecutively transversely with respect to the longitudinal direction and/or the plastics inserts run in the longitudinal direction of the structural component. Force can thereby be distributed particularly readily in the vehicle structural component.

The fiber-reinforced plastics inserts preferably run along an outer surface of the vehicle structural component. In particular, part of the outer surface of the vehicle structural component is formed by a surface of a plastics insert. This facilitates the production of the vehicle structural component since the fiber-reinforced plastics inserts can simply be inserted into a mold.

Particularly preferably, the at least one first fiber-reinforced plastics insert extends along an upper side of the vehicle structural component and the at least one second fiber-reinforced plastics insert along a lower side of the vehicle structural component. Alternatively or additionally, the plastics inserts can extend in an edge region of the vehicle structural component. An edge region of the vehicle structural component is arranged at the front or at the rear, as seen in the direction of the vehicle. By means of such an arrangement, the plastics inserts form a profile which is connected by the injection-molded rib structure. The vehicle structural component can thereby absorb particularly high loadings.

The reinforcing webs can be arranged spaced apart from one another in each case in the longitudinal direction of the vehicle structural component. Material can thereby be saved since fewer reinforcing webs have to be formed. In particular, the number of reinforcing webs can be adapted to the respective requirements in the vehicle structure.

According to one embodiment, the injection-molded rib structure comprises a short-fiber-reinforced thermoplastic and/or the plastics inserts comprise an endless fiber material. In particular, the plastics inserts are cut in the longitudinal direction to a predetermined length. Short-fiber-reinforced thermoplastics are particularly readily suitable for injection molding applications. The endless fibers of the plastics inserts can be impregnated with a resin. The endless fibers preferably run unidirectionally in the plastics inserts, and therefore the latter exhibit an anisotropic material behavior. As a result, the vehicle structural component has high rigidity especially in the longitudinal direction.

The metallic element can be spaced apart over its entire surface from the plastics inserts. This avoids stress peaks occurring in the vehicle structural component.

The vehicle structural component is preferably connected in an integrally bonded manner, in particular by spot welding or adhesive bonding, to an adjacent vehicle structure by means of the metallic element. A reliable, long-lasting fastening of the vehicle structural component to a vehicle structure can therefore be achieved.

The object of the invention is furthermore achieved by a method for producing a vehicle structural component which is designed as described previously, wherein the method comprises the following steps:
a) providing a mold,
b) heating at least one first and at least one second fiber-reinforced plastics insert,
c) forming the at least one first and at least one second plastics insert,
d) inserting the at least one first and at least one second formed plastics insert into the mold,
e) insert molding the plastics inserts with plastic, and
f) attaching at least one metallic element to the vehicle structural component by insert molding in step e) and/or by means of fastening means in such a manner that at least one plastics insert protrudes through a recess in the metallic element.

A method of this type permits the production of a vehicle structural component according to the invention in large series.

The mold can comprise at least one mold upper part and at least one mold lower part, wherein the at least one first fiber-reinforced plastics insert is inserted into the mold upper part and the at least one second fiber-reinforced plastics insert into the mold lower part in such a manner that the plastics inserts lie against an inner surface of the mold parts. As a result, after the injection molding, the plastics inserts form at least part of an outer surface of the vehicle structural component.

The mold upper part and the mold lower part each comprise engagement means for engagement between the fiber-reinforced plastics inserts from the side. The engagement means have a complementary shape with an offset predetermined with respect to one another as injection clearances, wherein the plastic is injected into the injection clearances.

Further features and advantages of the invention emerge from the description below and from the following drawings, to which reference is made.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
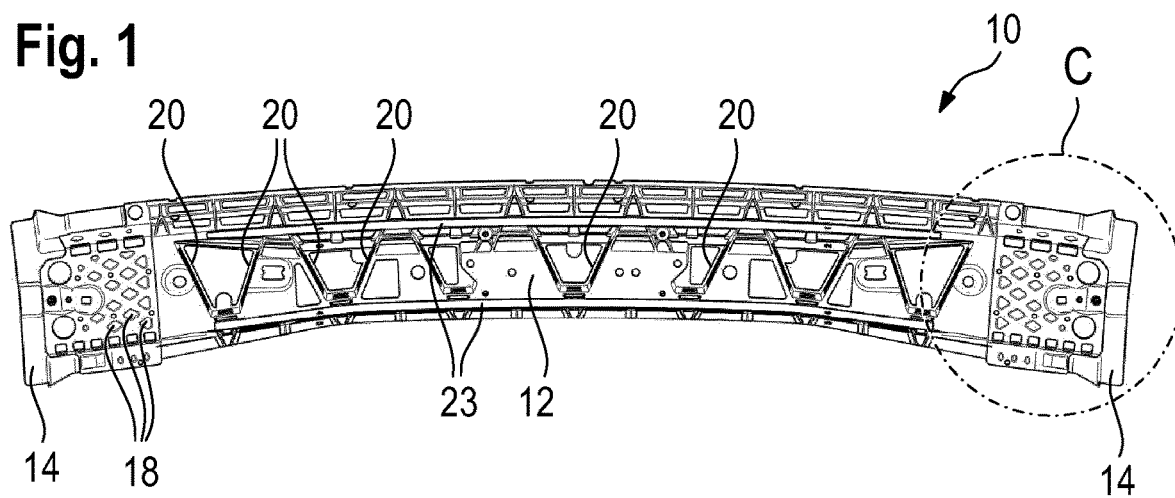
FIG. 1 shows a vehicle structural component according to the invention in a bottom view.

FIG. 1 shows a vehicle structural component 10 according to the invention.

The vehicle structural component 10 is, for example, a cross strut, in particular a roof transverse structural component, which connects a left roof frame and a right roof frame to each other in the transverse direction of the vehicle. The embodiment of the vehicle structural component 10 that is shown in FIGS. 1 to 12 depicts a roof bow.

The vehicle structural component 10 is designed as a hybrid component and has an injection-molded rib structure 12 composed of a short-fiber-reinforced thermoplastic and a respective metallic element 14 at the ends on the longitudinal side. The injection-molded rib structure 12 substantially provides the vehicle structural component 10 with its shape. In addition, the use of plastic is advantageous with respect to the vehicle weight. The vehicle structural component 10 can be attached to the vehicle body via the metallic elements 14 using known manufacturing methods, for example by means of spot welding. For this purpose, a region of the metallic elements 14 is free from the surrounding injection-molded rib structure 12.

The metallic elements 14 can be, for example, insert parts, in particular steel sheets, which are partially insert molded by the injection-molded rib structure and are thus fixedly connected to the injection-molded rib structure 12. For this purpose, the metallic elements 14 have recesses 16 which are visible in the Figures below, for example in FIG. 6. The recesses 16 are filled with the plastic of the injection-molded rib structure 12. Depressions 18 (see FIG. 1) are arranged in the region of the recesses 16 in the injection-molded rib structure 12 in order to avoid material accumulations. Such material accumulations could lead to sink marks in the finished component.

Alternatively, the metallic elements 14 can be connected to the injection-molded rib structure 12 by an integrally bonded connection, frictional connection and/or form-fitting connection, in particular by adhesive bonding, riveting and/or screwing.

As seen in the longitudinal direction, the vehicle structural component 10, in particular the injection-molded rib structure 12, has a multiplicity of reinforcing webs 20 which run consecutively transversely with respect to the longitudinal direction and are spaced apart from one another in each case in the longitudinal direction of the vehicle structural component 10. They ensure the necessary stability of the vehicle structural component 10. The reinforcing webs 20 extend substantially over the entire width of the vehicle structural component 10, in particular over the entire width of the vehicle structural component 10. In the mounted state, the width of the vehicle structural component 10 runs in the longitudinal direction of the vehicle.

The vehicle structural component 10 furthermore comprises a plurality of fiber-reinforced plastics inserts 22, 23, in particular four fiber-reinforced plastics inserts 22, 23. The latter extend substantially along a longitudinal direction of the vehicle structural component 10 and are partially surrounded by the injection-molded rib structure 12 and are embedded therein. Two first fiber-reinforced plastics inserts 22 run along an upper side and two second fiber-reinforced plastics inserts 23 run along a lower side of the vehicle structural component 10, as is visible in FIGS. 1 and 3.

In particular, the fiber-reinforced plastics inserts 22 are arranged in such a manner that they form a profile, wherein the injection-molded rib structure 12 is at least partially arranged between the plastics inserts 22. The fiber-reinforced plastics inserts 22 are preferably fiber bundles comprising an endless fiber material.

The metallic elements 14 are spaced apart over their entire surface from the fiber-reinforced plastics inserts 22, 23.

As seen in a cross section, the reinforcing webs 20 of the injection-molded rib structure 12 run at an angle in relation to the plastics inserts 22, 23 and with respect to one another.

In addition, as seen in cross section, in each case at least two adjacent reinforcing webs 20 form a local reinforcing unit with one of the plastics inserts 22, 23. The vehicle structural component 10 therefore has a lattice-like structure which enables force to be particularly readily distributed in the vehicle structural component 10.

According to one variant, the vehicle structural component 10 can have further metallic inserts, for example an insert 24 which extends between the two metallic elements 14 in the longitudinal direction of the vehicle structural component 10, in particular is adjacent to the metallic elements 14. The insert 24 has a surface 26 which is exposed in a top view of the vehicle structural component 10 and can be painted. The insert 24 can serve for the fastening of further vehicle components.

Figure 2:
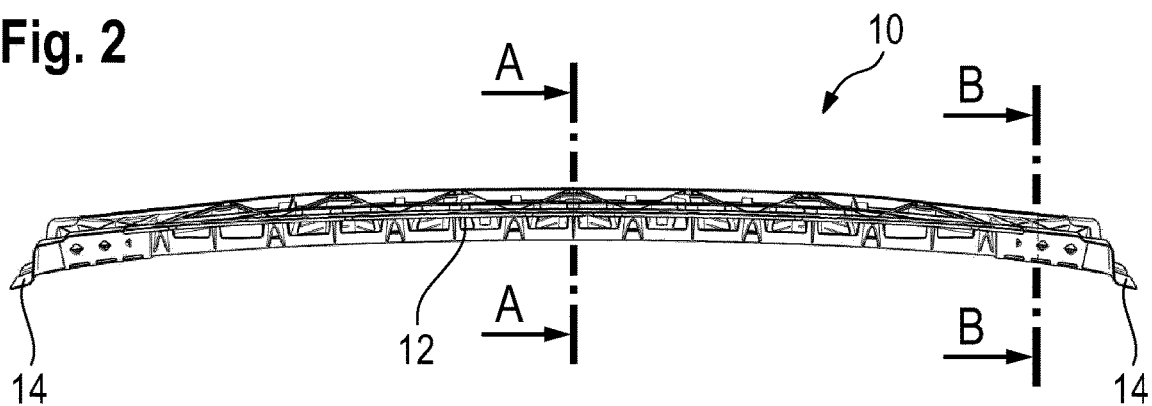
FIG. 2 shows the vehicle structural component from FIG. 1 in a front view.
Figure 3:
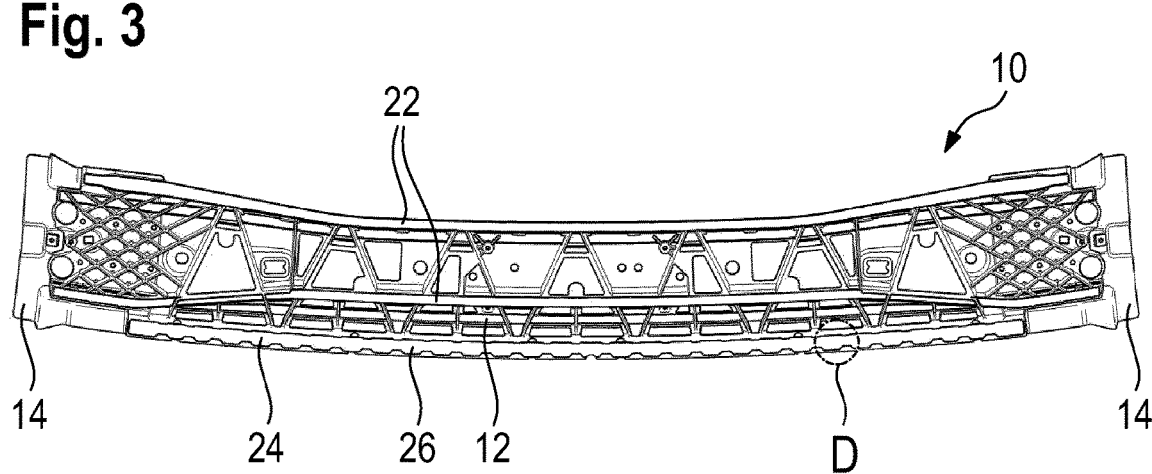
FIG. 3 shows the vehicle structural component from FIG. 1 in a top view.
Figure 4:
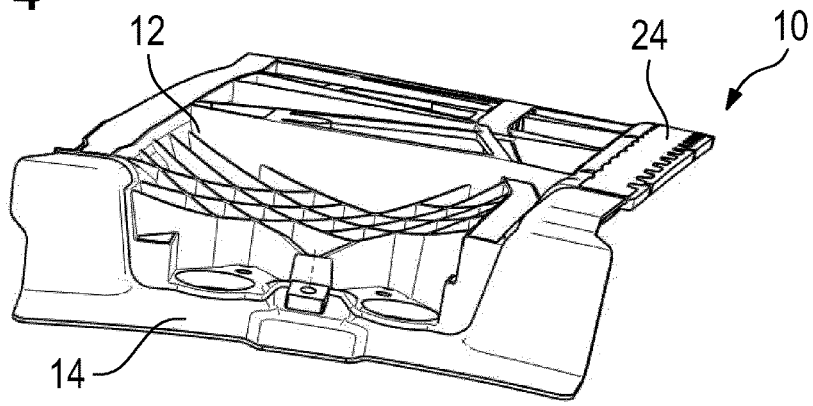
FIG. 4 shows the vehicle structural component from FIG. 1 in a side view.
Figure 5:
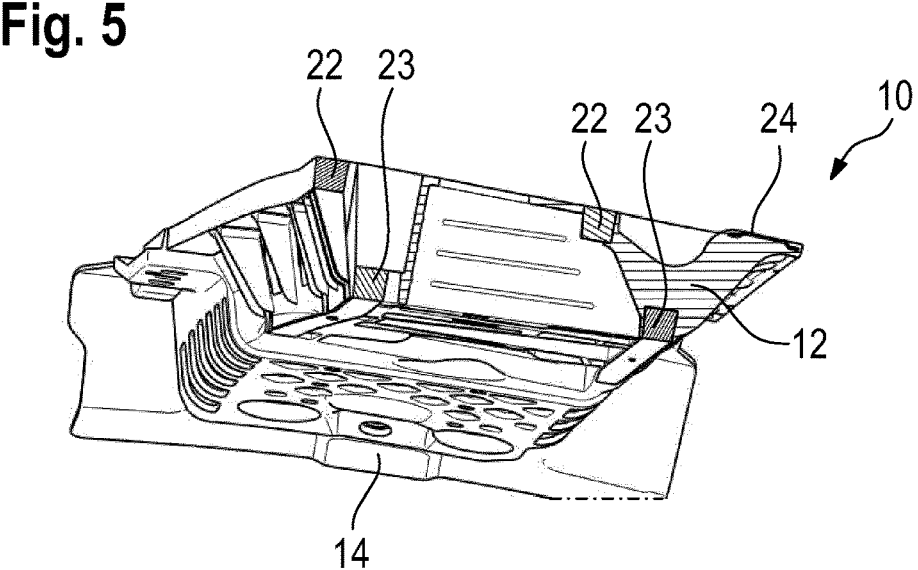
FIG. 5 shows a section through the vehicle structural component along the line A A in FIG. 2.

FIG. 5 shows a section through the vehicle structural component along the section line A-A illustrated in FIG. 2.

This illustration shows the arrangement and shape of the fiber-reinforced plastics inserts 22, 23.

In particular, the plastics inserts 22, 23 are arranged in the edge regions of the vehicle structural component 10. Just one plastics insert 22 is offset slightly inward since the metallic insert 24 is already arranged at an edge region on the upper side of the vehicle structural component 10.

Figure 6:
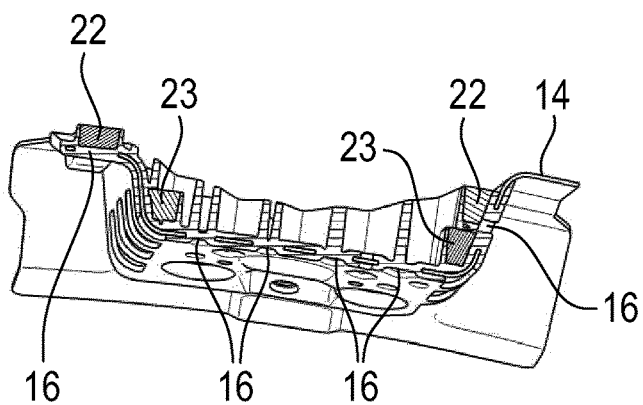
FIG. 6 shows a section through the vehicle structural component along the line B B in FIG. 2.

FIG. 6 shows a section along the line B-B illustrated in FIG. 2. The recesses 16 of the metallic element 14 that are filled, in particular insert molded, with the plastics material of the injection-molded rib structure 12 can be seen in this sectional illustration.

It becomes clear from FIGS. 5 and 6 that the fiber-reinforced plastics inserts 22, 23 have a variable cross section. In the central region of the vehicle structural component 10, the plastics inserts 22, 23 have a substantially rectangular cross section. In the edge region, in particular in the region in which the metallic elements are arranged, the cross section is adapted to the flattening geometry of the vehicle structural component 10 and to the geometry of the metallic element 14 in such a manner that the plastics inserts 22, 23 and the metallic element 14 are spaced apart from one another. In particular, the metallic element 14 is spaced apart over its entire surface from the plastics inserts 22, 23.

FIG. 7 shows once again, in a detailed view C, the connection between the injection-molded rib structure 12 and the metallic element 14. The metallic element 14 has an exposed attachment region 28 which is not surrounded by the injection-molded rib structure 12. In addition, a plurality of circular areas 30, 32, 34 of the metallic element 14 are recessed from the injection-molded rib structure 12. Welding points, for example, can be placed at the areas 30, 32, 34 and in the attachment region 28.

Figure 8:
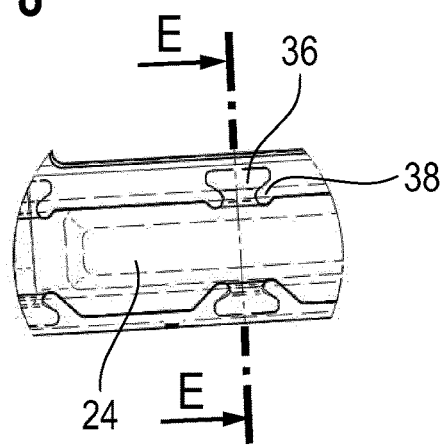
FIG. 8 shows a detailed view of the vehicle structural component of the region denoted by D in FIG. 3.

FIG. 8 shows the geometry of the insert 24 in a detailed view D, wherein the injection-molded rib structure 12 is illustrated transparently. The insert 24 has T-shaped tabs 36 with undercuts 38. The tabs 36 are insert molded by the plastic of the injection-molded rib structure 12, and therefore the insert 24 is anchored fixedly in the injection-molded rib structure 12 because of the undercuts 38.

Figure 9:
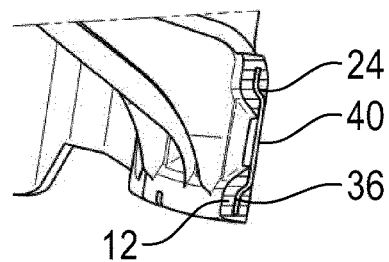
FIG. 9 shows a section along the line E E in FIG. 8.

FIG. 9 shows a section through the insert 24 along a line E-E. The insert 24 is bent inward in an edge region, in particular in the region of the tabs 36. The tabs 36 run parallel to a main surface 40 of the insert 24, but offset inward. As a result, the surface 40 of the insert 24 can be outwardly free from the injection-molded rib structure 12 while the tabs 36 are anchored in the injection-molded rib structure 12 and thus fix the insert 24 to the vehicle structural component 10.

Figure 7:
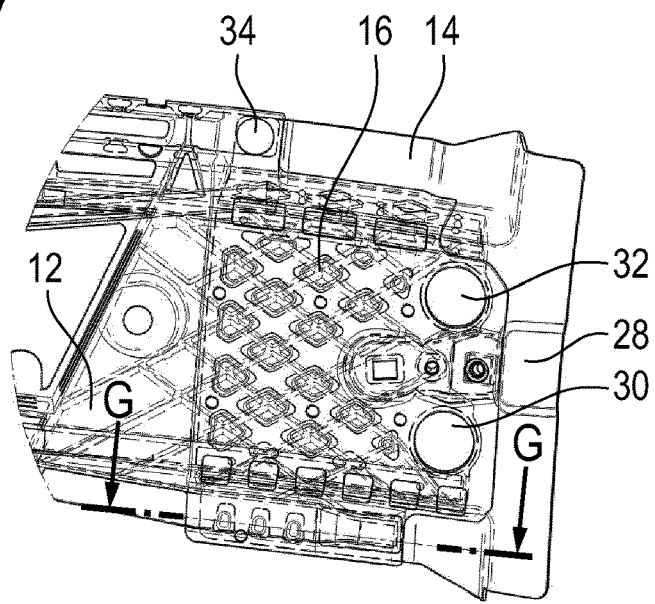
FIG. 7 shows a detailed view of the vehicle structural component of the region denoted by C in FIG. 1.
Figure 10:
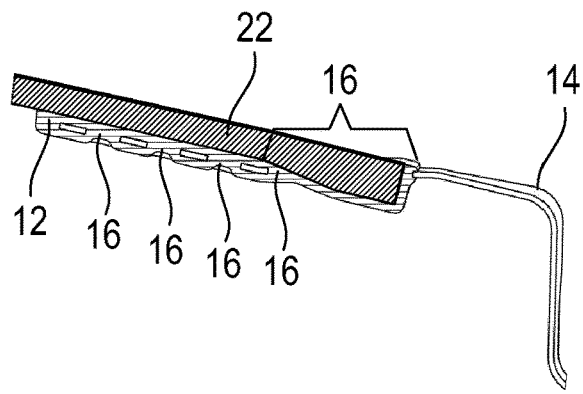
FIG. 10 shows a section along the line G G in FIG. 9.

FIG. 10 shows a section along the line G-G illustrated in FIG. 7. The section extends along a longitudinal direction of the vehicle structural component. It is apparent in this illustration that the fiber-reinforced plastics insert 22 protrudes through one of the recesses 16 in the metallic element 14 (see the right recess with the bracket). The remaining recesses 16 are filled only by the plastic of the injection-molded rib structure 12. During a transverse loading of the vehicle, a force can thereby be transmitted particularly readily from the vehicle structural component 10 to a surrounding vehicle structure. It can also be seen in the right recess 16 that the plastic of the injection-molded rib structure 12 makes contact with the edge of the recess 16, and therefore it forms a type of bridge from the metal edge to the premanufactured plastics insert 22 which, in this region, protrudes in and through the recess 16. The plastics insert 22 therefore does not make contact with the element 14.

Figure 11:
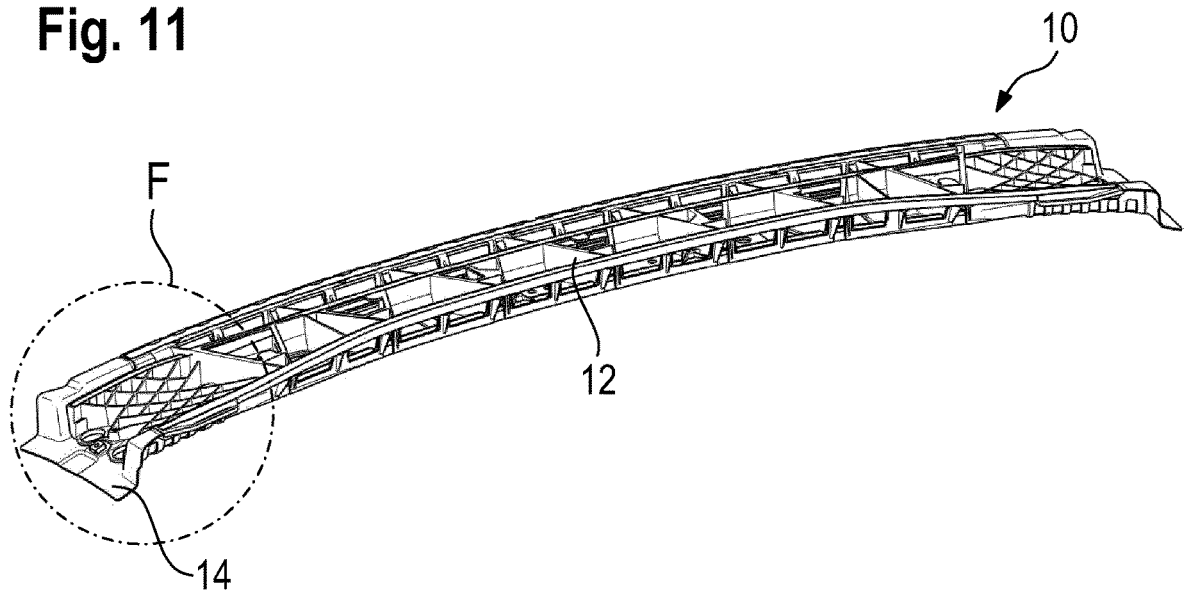
FIG. 11 shows an isometric view of the vehicle structural component.
Figure 12:
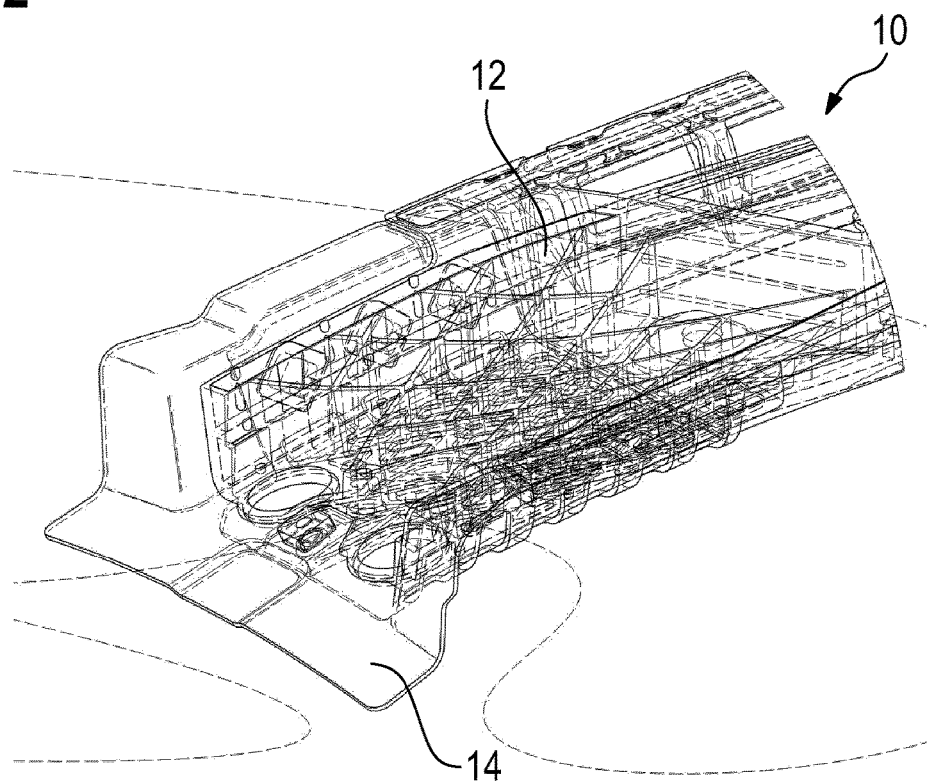
FIG. 12 shows a further detailed view of the region denoted by F in FIG. 11.

FIGS. 11 and 12 additionally show an isometric view of the vehicle structural component 10 and a further detailed view.

Figure 13:
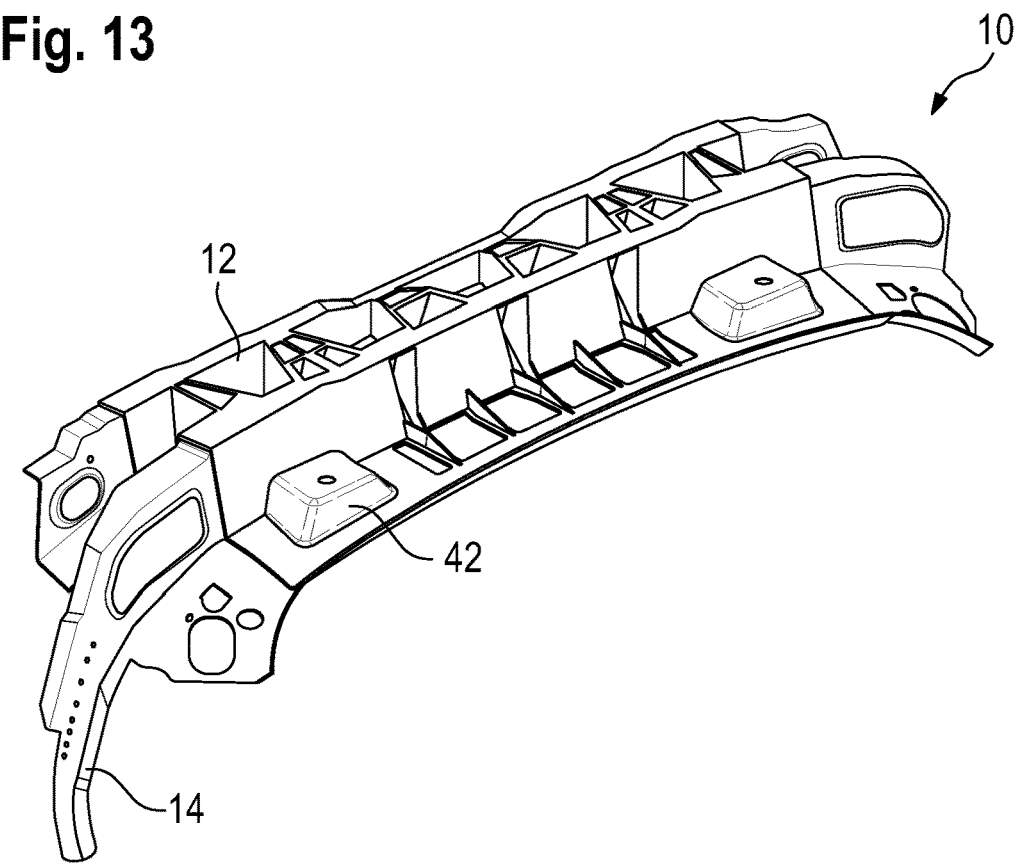
FIG. 13 shows a further vehicle structural component according to the invention.
Figure 14:
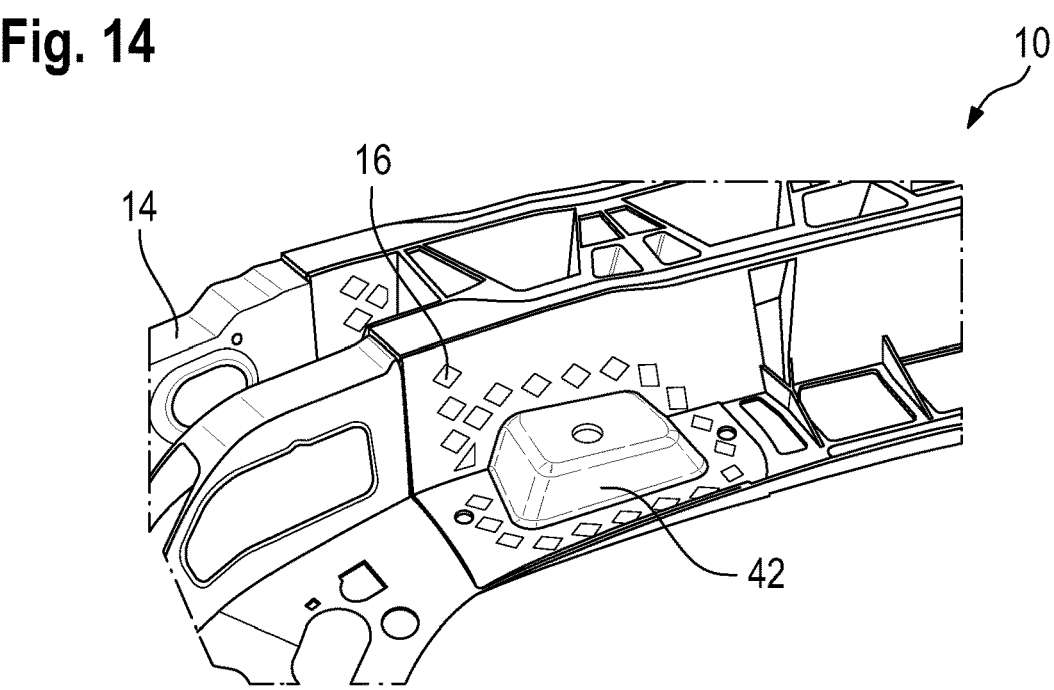
FIG. 14 shows a detailed view of the vehicle structural component from FIG. 13.

The embodiment of the vehicle structural component 10 that is illustrated in FIGS. 13 and 14 illustrates a rear window frame. In principle, the vehicle structural component 10 in this embodiment is constructed precisely as described in FIGS. 1 to 12, but the geometry is correspondingly adapted to the vehicle structure in the rear region. In order to permit attachment of a tailgate, the vehicle structural component 10, in particular the metallic element 14, has an additional exposed region 42, that is to say a region which is free from the injection-molded rib structure 12.

The vehicle structural component can be connected in an integrally bonded manner, in particular by spot welding or adhesive bonding, to an adjacent vehicle structure (not illustrated) by means of the metallic element 14.

In order to produce a vehicle structural component 10, the fiber-reinforced plastics inserts 22, 23 and the metallic elements 14 are inserted into a mold, specifically in such a manner that at least one plastics insert 22, 23 protrudes through a recess 16 of the metallic element 14, but with a gap with respect to the element 14. The plastics inserts 22, 23 are subsequently insert molded together with the metallic elements 14, with the gap being filled in the process. Alternatively, the metallic elements 14 can be attached to the vehicle structural component 10, for example by adhesive bonding, screwing or riveting, only after the injection molding process.

The plastics inserts 22, 23 are heated and formed in a previous process step.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle structural component, comprising:
   a first pair of fiber-reinforced plastics inserts;
   a second pair of fiber-reinforced plastics inserts;
   wherein the first pair of fiber-reinforced plastics inserts and the second pair of fiber-reinforced plastics inserts run along a longitudinal direction of the vehicle structural component, wherein the first pair of fiber-reinforced plastics inserts runs along an upper side of the vehicle structural component, and wherein the second pair of fiber-reinforced plastics inserts runs along a lower side of the vehicle structural component;
   an injection-molded rib structure, wherein the first pair of fiber-reinforced plastics inserts and the second pair of fiber-reinforced plastics inserts are partially surrounded by the injected-molded rib structure and are embedded in the injected-molded rib structure; and
   a metallic element connected to the injection-molded rib structure which forms an attachment region of the vehicle structural component;
   wherein at least one of the fiber-reinforced plastics inserts of the first and the second pairs of fiber-reinforced plastics inserts protrudes through a recess in the metallic element.

2. The vehicle structural component according to claim 1, wherein the metallic element is connected to the injection-molded rib structure by one of an integrally bonded connection, a frictional connection, or a form-fitting connection.

3. The vehicle structural component according to claim 1, wherein the injection-molded rib structure has a plurality of reinforcing webs running at an angle in relation to the first and the second pairs of fiber-reinforced plastics inserts and with respect to one another as seen in a cross section.

4. The vehicle structural component according to claim 1, wherein, as seen in a cross section, at least two adjacent reinforcing webs form a local reinforcing unit with one of the first and the second pairs of fiber-reinforced plastics inserts.

5. The vehicle structural component according to claim 1, wherein, in the longitudinal direction of the vehicle structural component, a plurality of reinforcing webs run consecutively transversely with respect to the longitudinal direction.

6. The vehicle structural component according to claim 1, wherein, in the longitudinal direction of the vehicle structural component, a plurality of reinforcing webs run consecutively transversely with respect to the longitudinal direction and wherein the plurality of reinforcing webs are disposed spaced apart from one another in the longitudinal direction.

7. The vehicle structural component according to claim 1, wherein the injection-molded rib structure is a short-fiber-reinforced thermoplastic and/or the first and the second pairs of fiber-reinforced plastics inserts include an endless fiber material.

* * * * *